May 13, 1969   J. H. CALBECK   3,443,888
PRECIPITATION METHOD

Filed Jan. 16, 1964   Sheet _1_ of 2

FIG. 1

INVENTOR.
JOHN H. CALBECK
BY
*John H. Widdowson*
ATTORNEY 3,443,888
PRECIPITATION METHOD
John H. Calbeck, Box 946, Pratt, Kans. 67124
Filed Jan. 16, 1964, Ser. No. 338,244
Int. Cl. C01g 9/08
U.S. Cl. 23—56          25 Claims

ABSTRACT OF THE DISCLOSURE

In a method of continuous precipitation, reactants forming a water soluble salt and a precipitate are added to a hot saturated solution of said water soluble salt, the resultant mixed salts are removed and separated.

---

This invention relates to a precipitation method. More specifically this invention relates to a continuous precipitation process having improved product quality control, and particularly adapted for the production of pigments, and the like. More specifically this invention relates to a precipitation process wherein reactants are introduced to a hot mother liquor, the desired products precipitated out in the mother liquor mixture while continuously evaporating water therefrom to maintain a constant liquor level and concentration. The invention in still a more specific aspect relates to a continuous precipitation method particularly adapted for the production of high quality zinc sulfide pigment wherein the reactive mother liquor mixture concentrations are selected and maintained at the desirable concentrations which make possible increased precipitation rates and a high quality product. The invention also relates to a precipitation process wherein trace impurities are automatically removed from the reaction vessel and are not allowed to build up to hinder the reaction. This invention relates to improvements in the precipitation of pigment zinc sulfide whereby the reaction can be continued indefinitely under conditions of uniform reactant concentrations, pH, temperature and rate of reaction and whereby the particle size and crystal habit of the precipitate can be controlled and maintained at a desired level.

Production of zinc sulfide pigment and other related pigments by precipitation methods is in general old in the art. For example my patent, No. 2,006,259, discloses a method of producing zinc sulfide pigment by a batch process. However, the batch processes for producing pigment known to the prior art have the inherent disadvantages common to batch processes in general. In a batch process a great deal of labor and attention is needed in order to obtain satisfactory results. Further, the conditions of the reactant environment changes as the process progresses. For this reason the rate of reaction varies with time. The precipitation product characteristics such as size, and in some cases the type of particle, also varies during the batch cycle. Moreover in a batch process for producing pigment the precipitation thereof must usually be initiated by seeding. This seeding, in addition to amounting to added expense for labor etc. has a definite effect on the precipitation product characteristics, and can result in product variation, if not done properly and consistently. Continuous precipitation methods are also old in the art. However, the known continuous precipitation methods for the production of pigments have not been successful to obtain the desired high quality control of the product. These processes have not been adapted to utilize the optimum precipitation conditions or reaction environment necessary for efficient product control. Consequently the product obtained from such have been unsatisfactory for many purposes without resorting to time consuming and expensive grinding and drying procedures. Further, environment cannot be suitably held constant at the desired conditions and concentrations to make possible a high rate of reaction or precipitation desirable for commercial adaptation. A still more serious disadvantage of presently known continuous precipitation processes for the production of pigments etc. is that impurities such as calcium sulfate, magnesium sulfate, and the like will build up in the mother liquor, and ultimately vary the reaction environment so that the desired reaction will be inhibited and/or the product quality lowered. Normally this difficulty is avoided by removing a portion of the reacting environment either continuously or intermittently and discarding it in order to keep the impurities at a suitable low level. This removal or "purging" presents problems of control, additional equipment, etc., and often results in the waste of reactants and product.

I have invented a new precipitation process which overcomes all of the foregoing problems associated with the prior art. Further, the new process of my invention is particularly adapted to be combined with known processes of refining the raw ore and thereby enable the utilization, re-use, and recycling of the by-products thereof.

In my new method of precipitation, metallic ions, and anions reactable with the metallic ions, are introduced into a reaction vessel. Metallic ions and anions are caused to react to form a precipitate. A portion of the resultant reaction mixture, containing precipitate, is withdrawn from the reaction mixture, and the precipitate separated therefrom. The resulting filtrate is recycled back to the reaction vessel, which filtrate contains appreciable amounts of unreacted metallic ions and anions.

In preferred embodiments of my method, the reaction vessel contains a mother liquor mixture. The concentrations of components therein is maintained relatively constant. This is accomplished by continuously removing a portion of the liquor mixture, separating the precipitate and returning the filtrate, while evaporating water therefrom. The particle size of the precipitate can be controlled by recycling a portion of the precipitate with the filtrate to "seed" the mother liquor mixture.

A preferred specific embodiment of the new precipitation method of my invention is particularly adapted for producing zinc sulfide pigment. In this embodiment aqueous streams of zinc sulfate and ammonium thiosulfate are introduced in stoichiometric proportions to a hot mother liquor containing zinc sulfate, ammonium thiosulfate, and ammonium sulfate. The zinc ions react with thiosulfate ions in the mother liquor to precipitate out zinc sulfide. Ammonium sulfate also precipitates out in the mother liquor solution. The pH of the mother liquor solution is maintained between three and five by the addition of a mixture of ammonia and steam or other inert gas. Water is evaporated from the mother liquor mixture in order to maintain approximately the same volume, and also cause precipitation by crystallization of the water soluble ammonium sulfate. A portion of the resulting mother liquor mixture is continuously circulated through a centrifuge attached in closed circuit to the reaction vessel. Substantially all of the mixed precipitate is separated from the mother liquor mixture. The resultant filtrate is recycled back to the reactor and contains an appreciable amount of zinc sulfide and ammonium sulfate. This serves to continuously "seed" the mother liquor mixture. The mixed precipitate is then separated into zinc sulfide pigment product and ammonium sulfate by suitable methods.

The new continuous precipitation process of my invention overcomes all of the problems associated with the precipitation processes known to the prior art. With my new process the environment in which the reactants precipitate is selected to make possible a high rate of reaction and a desirable high quality product. The environment can be held relatively constant throughout the process however long. In my continuous precipitation process, the rate of reaction is maintained at a relatively high value thereby making possible an efficient utilization of equipment, space, etc. This materially lowers the capital investment involved in equipment necessary to produce pigment, etc. Moreover, the physical characteristics of the product obtained from my continuous precipitation process is uniform, since the same environment is used throughout in the precipitation of the reactants. The new process of my invention eliminates a problem associated with continuous precipitation methods known to the prior art since the system is self-purging. The trace impurities such as calcium sulfate, magnesium sulfate, alkali metal salts, etc. will not build up in the reaction vessel since they will normally precipitate out and be carried out along with the product stream. In my continuous precipitation the impurities are removed because the contaminants reach a saturation point and are then removed with the crystals. For example, calcium, magnesium and alkali metal salts build up to saturation and then crystallize out with the ammonium sulfate, or other water soluble salt, as double salts or complexes and therefore do not contaminate the pigment zinc sulfide, or other pigment, nor inhibit the rate of reaction. This purging is automatic, and does not require elaborate tests, purging, or equipment and labor to perform same. These features make my continuous precipitation process relatively easy to operate, which operation can often be done with relatively unskilled personnel after they have mastered the basic routine. Another important advantage of the new continuous precipitation process of my invention over the prior art is that "seeding" of the mother liquor is accomplished simply, efficiently and automatically. In my new process the filtrate containing substantial amounts of the precipitated product as it comes from the centrifuge or other suitable separation apparatus is recycled and automatically provides the "seeding" feature. Another important advantage of my new method over the prior art is that particle size of the precipitated product can be accurately and positively controlled by manipulating the centrifuge to remove only the particles that have grown to optimum size and returning the finer particles to the precipitation zone or mother liquor to act as seeds for containing reaction. This "in situ" classification makes possible a wider range of particle sizes than can be provided by seeding, and makes possible the extremely large particles frequently required when the precipitate is to be used for the manufacture of phosphorescent and fluorescent paints. This seeding initiates the crystallization or precipitation of the product and by-product. The new process of my invention provides very uniform and high quality precipitate of any desired characteristics, economically and efficiently.

An object of this invention is to provide a new precipitation method.

Another object of this invention is to provide a new continuous method for producing pigment products having improved physical characteristics.

Still another object of this invention is to provide a new precipitation method that is simple and efficient in operation.

Another object of this invention is to provide a continuous precipitation method wherein the reaction environment can be maintained at optimum conditions.

Still another object of this invention is to provide a continuous precipitation method that is self-purging of impurities normally introduced through the reactant feed.

Another object of this invention is to provide a method wherein the filtrate from the reaction mixture is recycled, which filtrate contains appreciable concentrations of unreacted reactants.

Yet another object of this invention is to provide a new continuous precipitation method wherein the reactant environment is automatically "seeded" to initiate and control precipitation.

Still another object of this invention is to provide a new precipitation method for the production of zinc sulfide which in practice can be combined with a parallel process for producing zinc sulfate from raw ore, wherein the by-products of each process can be recycled and re-used in the associated process.

Still another object of this invention is to provide a new continuous precipitation process particularly adapted for the production of pigment grade zinc sulfide of superior physical characteristics including a high whitening strength.

Still another object of this invention is to provide a new continuous precipitation method adapted to produce zinc chromate pigment of uniform high quality.

Another object of this invention is to provide a new continuous precipitation method particularly adapted to produce basic carbonate white lead of high quality.

Another object of this invention is to provide a new continuous precipitation process adapted to utilize equipment and apparatus requiring a relatively low capital investment.

Still another object of this invention is to provide a new continuous precipitation method adapted to produce paint pigment that is simple and dependable in operation.

Still another object of the invention is to provide a continuous precipitation process wherein there occurs a simultaneous precipitation of a pigment, evaporation of liquid, and a crystallization of a water soluble salt in a single reaction vessel, thereby eliminating the need of an expensive separate evaporator.

Other objects and advantages of the invention will be apparent to those skilled in the art from the disclosure set forth herein.

Drawings of preferred specific embodiments of the invention accompany and are a part hereof, and such are to be understood to not unduly limit the scope of the invention.

The following is a discussion, specific examples, and description of the new continuous precipitation process of my invention made with reference to the drawings, wherein the same reference numerals are used to indicate the same or similar parts and/or structure. The discussion, examples, and description are of preferred specific embodiments of the new continuous precipitation method of my invention, and it is to be understood that such are not to unduly limit the scope of my invention.

In general, the invention relates to improvements in the production of paint pigments, whereby a precipitation reaction to produce same can be continued indefinitely under conditions of uniform reactant concentrations of pH, temperature, and rate of reaction, and whereby the particle and crystal habits of the precipitate can be controlled and maintained at any desired level. A water soluble metallic salt is reacted with a soluble salt, more specifically a soluble sulfide, a carbonate and the like, a chromate, or a combination of a water soluble sulphur compound and a base. The products of the reaction are a metallic sulfide, chromate, or carbonates and the like, and a water soluble salt, which products are recovered from the mother liquor. The reaction is preferably carried on at boiling temperature and in a saturated solution with respect to the aforedescribed products, whereby not only is the metallic sulfide, chromate, or carbonate precipitated, but water is evaporated at a rate whereby the water soluble by-product is also precipitated as rapidly as produced by the reaction. In carrying on the process it is preferred to separate the two precipitates, the paint pigment, namely the metallic sulfide, chromate, etc., which is extremely fine and the by-product crystal which is relatively very coarse, from the mother liquor by a device in closed circuit with the precipitation vessel and also preferably maintained at the boiling temperature. The separating device can be anything suitable, for example, a continuous centrifuge, classifier, hydro-separator, or the like, that may be controlled to remove the pigment from the mother liquor when it reaches the desired sizes. The solid by-product crystals being many times larger than the pigment product will also be removed with the pigment. Thus, a continuous stream of reactants can be fed into the system and a mixture of product pigment and by-product crystals removed continuously while the mother liquor remains relatively unchanged as to chemical composition, pH and temperature. Water vapor is removed at a constant rate, and any suitable pressure can be employed.

A preferred specific embodiment of the new continuous precipitation method of my invention involved producing zinc sulfide pigment according to the reaction:

(1) 
$$ZnSO_4 + (NH_4)_2S_2O_3 + 2NH_4OH = ZnS + 2(NH_4)_2SO_4$$

Figure 1:
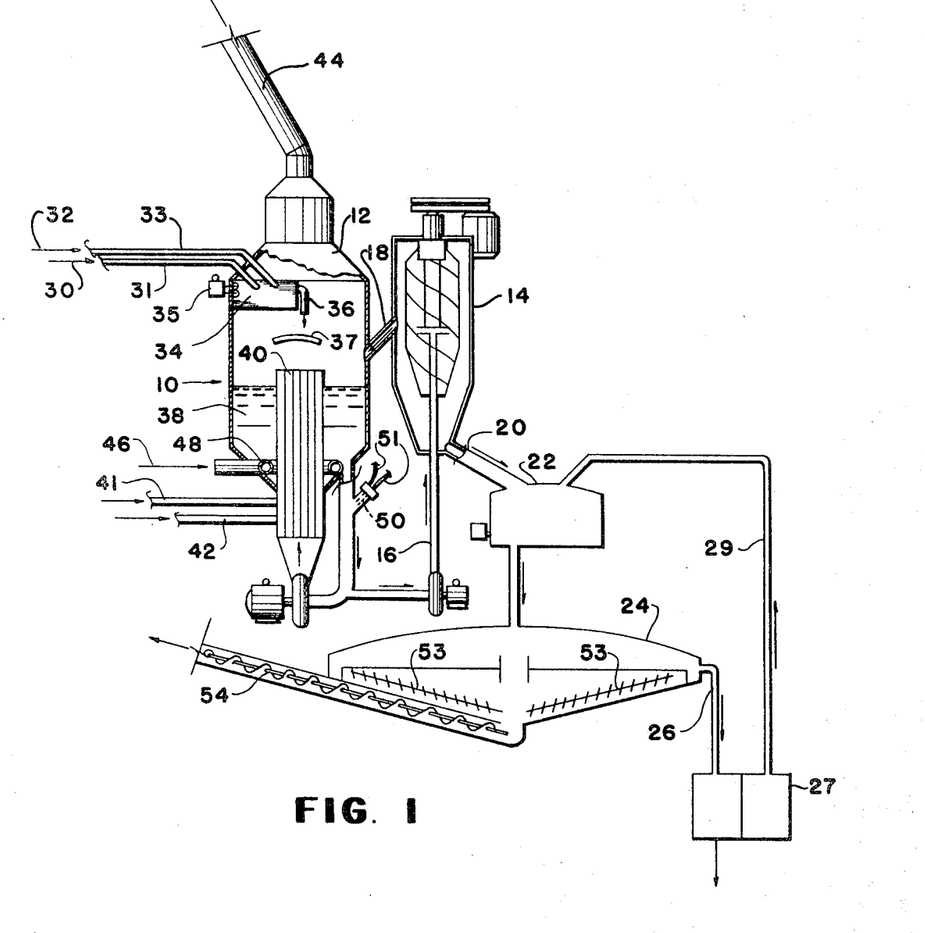
FIG. 1 is a schematic drawing of a preferred specific embodiment of the new continuous precipitation method of my invention for producing zinc sulfide particularly, and illustrating in diagrammatic form the flow streams and preferred associated apparatus.

Preferred apparatus for performing my new precipitation method is illustrated in FIG. 1. In FIG. 1 is shown a reactor 10 consisting of a large volume forced circulation evaporator shell 12 coupled with a continuous centrifuge 14. The mother liquor in the reactor 10 is continuously circulated through the centrifuge 14 entering through pipe 16. The filtrate or partially classified liquor is returned to the reactor 10 through pipe 18. The filtrate returned to the mother liquor contains appreciable amounts of unreacted reactants. In this respect, the concentration of the components in the filtrate returned from the centrifuge 14, or other device, contains approximately the concentrations of the components in the mother liquor. If desired, the smaller particles of precipitate are also returned to the mother liquor to act as "seeds" to control the size of the ultimate product. The solids removed by the centrifugal action are discharged through outlet 20 and preferably to a repulping agitator 22. The solids consisting of a mixture of zinc sulfide and by-product crystals are agitated in agitator 22 in a saturated solution and delivered to the bowl classifier 24. The finer zinc sulfide crystals remaining in suspension overflow through pipe 26 to a filter 27. Filtrate is returned via conduit 29 to the repulp agitator 22, and the filter cake of the zinc sulfide is discharged to a washing and finishing process.

In practice solutions, preferably saturated aqueous solutions of zinc sulfate and ammonium thiosulfate, indicated as 30 and 32 respectively, are delivered continuously through conduits 31 and 33 respectively in proper proportions to the pre-mix box 34 in the reactor 10. The rate of introduction is determined by the capacity of the equipment to evaporate water added by the reactants. The combined streams 30 and 32 are thoroughly agitated by agitator 35 mounted on the pre-mix box 34. The combined mixture thereafter passes through overflow pipe 36 into a mother liquor 38. If desired, a baffle 37 can be provided. Preferably the stream 30 of zinc sulfate has a concentration in the range of 170 to 190 grams of zinc ion per liter. However the stream can have any suitable concentration. The stream 32 of ammonium thiosulfate preferably has a concentration in the range of 750 to 850 grams per liter, although any suitable concentration can be utilized. Preferably the streams 30 and 32 are heated to a temperature in the range of 90 to 98 degrees C. The rate of entry of streams 30 and 32 are adjusted so that generally stoichiometric proportions of zinc sulfate and ammonium thiosulfate are introduced into the pre-mix box in accordance with the reaction hereinbefore. Preferably ammonium polysulfide is added to the thiosulfate stream 32 in an amount sufficient to give the combined stream a very light yellow color thereby purging it of traces of sulfite ion and providing a low concentration of sulfide ion. The sulfide ion initiates the precipitation of zinc sulfide when the two reacting solutions are mixed before being fed to the reactor.

Figure 2:
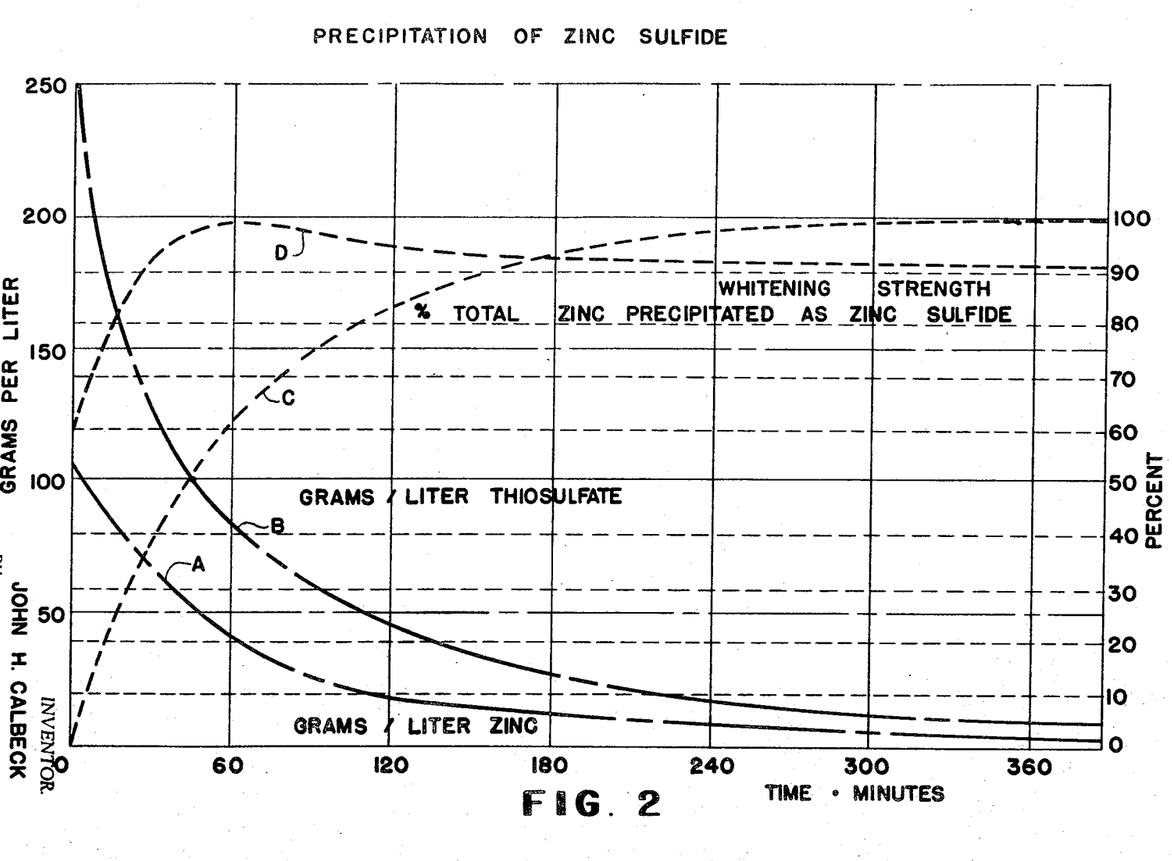
FIG. 2 is a graph of various operating values and conditions pertaining to the precipitation of zinc sulfide occurring at various times during a batch process, which values, etc., are used to determine the optimum conditions for the reactive environment in the new continuous precipitation process of my invention.

The concentration of the hot aqueous moter liquor 38 is adjusted and maintained to provide a favorable reactive environment for the precipitation of zinc sulfide. The determination of the proper concentrations in the mother liquor mixture are derived from the graph shown in FIG. 2. FIG. 2 is a graph prepared by taking periodic measurements of the concentrations of the reactants in a batch type precipitation process of zinc sulfide as set forth in my patent, No. 2,006,259. Curve A on FIG. 2 is a plot of concentration in grams per liter of zinc ion vs. time for the cycle of the process. Curve B is a similar plot of the concentration in grams per liter of ammonium thiosulfate vs. time. Curve C is a plot of the percent of zinc ion precipitated as zinc sulfide vs. time, and relates to the vertical scale on the right hand side of the graph. Curve D is a graph of the pigment whitening strength of the zinc sulfide precipitated out at any given time and also relates to the vertical scale on the right hand side. The whitening strength curve was obtained by removing quantities of the precipitate at different times and testing for whitening strength by the usual and accepted methods. As is evident this curve reaches a maximum at about fifty minutes and then falls off slowly as the precipitation reaches completion. The concentration of zinc ions at fifty minutes is 45 grams per liter, and of ammonium thiosulfate 90 grams per liter. The reaction rate at time fifty minutes, determined by the slope of curve C, is approximately 67 grams of zinc sulfide per liter per hour. The most preferred conditions to be maintained in the liquor phase or mother liquor in the continuous precipitation are indicated on the graph at about time fifty minutes. It has been determined that preferred ranges of mother liquor concentrations in the preferred embodiment of the method are, 25 to 60 grams per liter of zinc ion as zinc sulfide, more preferably 35 to 50 grams per liter, 50 to 100 grams per liter of ammonium thiosulfate, more preferably 60 to 90 grams per liter, 100 to 150 grams per liter of ammonium sulfate, more preferably 120 to 140 grams per liter, with the temperature at the boiling point. The boiling temperature is partially dependent on the atmospheric pressure or other pressure and is known in the range of 110 to 120 degrees C. I have found pressure at or near atmospheric suitable for processing my invention. However, higher or lower pressure can be used, if desired. The zinc sulfide particle size precipitated out under the aforementioned most preferred conditions is in practice usually less than 0.2 micron, and the ammonium sulfate particle size in suspension normally greater than 44.0 microns.

Water is evaporated from the reactive aqueous mother liquor mixture 38 in an amount equal or approximately equal to the amount added in the combined streams 30 and 32 to thereby maintain a constant liquid level in the reactor vessel 10. The evaporation of water is desirably accomplished with heating tubes 40 disposed within the evaporator shell 12. The evaporator tubes 40 preferably are heated by circulating steam through inlets 41 and 42. The evaporated water is exhausted from the evaporator shell 12 through the top, through the outlet 44.

As indicated by the foregoing reaction one equivalent of free ammonia is preferably added for every equivalent of zinc sulfate in order to promote the reaction. Preferably a diluted ammonia vapor 46 is introduced into the evaporator shell 12 through a perforated doughnut shaped tube 48 immersed in the mother liquor mixture. Desirably one volume of ammonia gas is combined with two volumes of steam or an inert gas. I have found that a basic sulfide is caused by direct combination of colloidal sulfide particles in suspension and zinc hydroxide formed by a side reaction. This is undesirable and can be avoided if the ammonia is diluted with moisture or other gases. Ammonia is added at the rate sufficient to maintain the pH of the mother liquor mixture preferably in the range of 3.0 to 5.0. For purpose of controlling the pH of a mother liquor mixture there is immersed there in electrodes 50 of pure antimony and pure zinc having leads 51 connected to a standard potentiometer (not shown). The potential indicated by the potentiometer is directly related to the pH of the mixture. Desirably the E.M.F. across the electrodes should be 700 millivolts or slightly better. If desirable, the E.M.F. so developed can be used to control a valve or similar means to control the amount of ammonia admitted to the reactor vessel. However, if desired aqua ammonia can be introduced directly into the reactor vessel, but if such addition is used additional water must be evaporated.

A portion of the resulting mother liquor mixture including the original mother liquor mixture and the precipitated crystals of zinc sulfide and ammonium sulfate is removed from the reactor 10 and delivered to the continuous centrifuge 14. The centrifuge is operated at a suitable speed to substantially separate the mother liquor and the precipitate. The resultant mother liquor filtrate is recycled to the reactor 10 through pipe or outlet 18. The recycling of the liquor from the centrifuge has a very advantageous result. In batch processes the precipitation of crystallization must ordinarily be initiated by seeding the mother liquor mixture. In the new process of my invention, the recycled filtrate from the centrifuge desirably has present therein, very small zinc sulfide particles and ammonium sulfate crystals which when returned serve as nuclei to ("seed") the reaction mixture. The speed of the centrifuge 14 is regulated so that a portion of the precipitate namely the very small particles are returned to serve this purpose. The precipitate removed from the mother liquor mixture is preferably delivered to a repulping tank 22 through outlet 20. The repulping tank 22 contains a saturated solution of ammonium sulfate. The mixture is preferably thoroughly agitated by agitator 52. The mixture of zinc sulfide and ammonium sulfate crystals in the saturated solution are then delivered from the repulping tank 22 to the bowl classifier 24. The heavy ammonium sulfate crystals settle to the bottom and are raked toward the center with rakes 53, and then withdrawn by the conveyor 54. The finer zinc sulfide crystals remain in suspension and overflow through outlet 26 to a filter 27. The filter separates the zinc sulfide from the filtrate. The filtrate, a saturated solution of ammonium sulfate is returned to the repulping tank 22 through conduit 29. The zinc sulfide product is then dried, and can be utilized in the final form as a paint pigment, etc. If desired, the quality of zinc sulfide product can be improved by calcining. This is desirably accomplished by placing the dried pigment in an oven heated to 550 to 650 degrees C. in an oxygen-free atmosphere for approximately 30 minutes, cooling in an oxygen-free atmosphere, and subsequently milling in a dry impact mill.

It is frequently desirable to combine with the zinc sulfide or other pigment a quantity of inert materials to produce a composite pigment. Such composite can be prepared by adding the inert material to the continuous precipitation in the proper proportion continuously. Materials such as silica, titanium dioxides, or hydroxides, vanadium oxides, or inert colloidal compounds can be dispersed in the water, and the slurry added to the mother liquor in a continuous stream where it acts as a seed upon which the freshly formed zinc sulfide will plate out to develop hiding power for the composite which is materially greater than the sum of the hiding powers of the individual components.

Control of the pH in the precipitation by use of the zinc-antimony electrode is used to control the reaction. However, the reaction proceeds, and a relatively good product is obtained, if the acidity is allowed to develop to the point where the ammonium thiosulfate is used to neutralize the acid. This results in the production of elemental sulphur equivalent to the zinc sulfide precipitated, and the consumption of twice as much ammonium thiosulfate. The reaction responsible for this is:

$$ZnSO_4 + 2(NH_4)_2S_2O_3 = ZnS + 2(NH_4)_2SO_4 + SO_2 + S$$

The elemental sulphur in the boiling mother liquor collects in beads or pellets of large size and is removed in the centrifuge with the zinc sulfide and ammonium sulfate. Relatively little sulphur dioxide is liberated, because it is converted to thiosulfate on contact with elemental sulphur.

As previously mentioned, the basicity in the precipitate is prevented by proper dilution of the neutralizing ammonia with steam, air or inert gas. Normally the inert sulfide is not basic but there are times when a high degree of basicity is desirable. Basicities as high as 40 percent can be obtained if concentrated ammonia vapors are used, and the control of the basicity can be obtained by manipulating the degree of dilution of the ammonia gases.

My Patent No. 2,074,210 discloses a method for producing zinc sulfate, ammonium thiosulfate and ammonia by reacting zinc sulfide ores with ammonium sulfate crystals, according to the following reaction:

(2)  $ZnS + 2(NH_4)_2SO_4 = ZnSO_4 + (NH_4)_2S_2O_3 + 2NH_4OH$

This is reaction (1) in reverse, and when the two reactions are combined in a cyclic process a method is provided for making zinc sulfide pigment directly from the ore. In my method of producing zinc sulfate, zinc sulfide ore is calcined with approximately two equivalents of ammonium sulphate at a temperature between 150 degrees C. and 440 degrees C. preferably in absence of oxygen. The resultant volatile mixture of ammonium sulfite and sulphur is condensed in an environment at a temperature above 100 degrees C. This sublimate mixture is held at that temperature until substantially all the ammonium sulfite has been converted to ammonium thiosulfate. Ammonia also is evolved as indicated by the above reaction. When the two reactions are combined, reaction (2) provides ammonium thiosulfate, zinc sulfate, and ammonia which are combined to produce reaction (1) as previously described. The by-product of the reaction (1), namely ammonium sulfate is then recycled back to the calcining reaction (2). Such a cyclic process has been in use and has provided a pigment far superior to zinc sulfide pigments made by other processes.

Zinc sulfide of good quality can also be produced in accordance with the following reaction:

(3)  $ZnSO_4 + Na_2S = ZnS + Na_2SO_4$

Reactant solution streams of sodium sulfide and zinc sulfate can be introduced directly into the reactor (without passing through the pre-mix box 34) in the same manner that zinc sulfate and ammonium thiosulfate were introduced as described previously. However, in this instance no neutralizing base is normally used, and a relatively constant pH is preferably maintained by control of the volume of the two reactants. A pH of from 3.0 to 5.0 is desirably maintained corresponding to 700 to 730 mv. on the zinc-antimony couple. It has been found that a slight excess of sodium sulfide increases the pH and a slight excess of zinc sulfate decreases the pH. In this instance a high dilution of the reactants is maintained in the mother liquor to obtain desirable particle size. The concentration of zinc ions in the mother liquor can be any suitable concentration, most preferably less than 25 grams per liter. The mother liquor should also contain sodium sulfate in a suitable concentration, preferably in the range of 220 to 260 grams per liter, more preferably 210 and 250 grams per liter. The zinc sulfate solution reactant stream is preferably the same as in the process relating the reaction (1). The sodium sulfide reactant stream can be any suitable concentration, preferably 250 to 350 grams per liter of sodium sulfide, most preferably in the range of 290 to 310 grams per liter.

Zinc sulfide pigment of good quality can also be prepared in accordance with the following reaction:

(4)  $ZnCl_2 + BaS = ZnS + BaCl_2$

Preferably strong solutions of zinc chloride and barium sulfide are reacted in apparatus similar to that illustrated in FIG. 1, preferably without passing through the pre-mix box 34, without the addition of a neutralizing base. A pH of between 3.0 to 5.0 is desirably maintained by manipulation of the rates at which the reactants are added. A low concentration of the reactant is maintained in the mother liquor and the crystals of barium chloride $$BaCl_2 \cdot 2H_2O$$

are removed from the reactant with zinc sulfide by the centrifuge. The mother liquor is preferably a saturated solution of barium chloride with low concentration of the reactants. Preferably the mother liquor has 50 to 60 grams of zinc chloride per liter and preferably 260 to 280 grams per liter of barium chloride. The reactant streams can be of any suitable concentration preferably high to reduce the amount of water that must be evaporated. I have found that a cation reaction stream that contains approximately 400 grams per liter of zinc chloride, and an anion reactant stream with from 290 to 310 grams per liter of barium sulfide works very well.

Zinc sulfide pigment of good quality can also be produced by the following reaction:

(5)  $ZnSO_4 + H_2S + 2NH_4OH = ZnS + (NH_4)_2SO_4$

The mother liquor is an aqueous solution of zinc sulfate and ammonium sulfate in suitable concentrations. Preferably the mother liquor has from 60 to 70 grams per liter of zinc sulfate and from 200 to 240 grams of ammonium sulfate per liter. The cation reactant stream is basically the same as set forth in the process relating to reaction (1). The anion reactant stream is hydrogen sulfide gas. It has been found desirable to maintain the pH between 3.0 and 5.0 by the addition of ammonia as set forth in the process relating to reaction (1).

Pigment quality cadmium sulfide can be produced by my continuous process by substituting a cadmium sulfate reactant solution, preferably concentrated, for the zinc sulfate solution of reactions (1), (3) and (5). In reaction number (4) a concentrated solution of cadmium chloride can be substituted for zinc chloride.

Zinc chromate pigment can be produced with my continuous precipitation process in accordance with the reaction:

(6)  $ZnSO_4 + K_2CrO_4 = ZnCrO_4 + K_2SO_4$

In this preferred specific embodiment of the new process of my invention, a mixture of zinc chromate in potassium sulfate (anhydrous) is obtained which can easily be separated by screening or sedimentation. The zinc sulfate and potassium chromate reactant solutions are metered into the boiling mother liquor preferably in exact proportions and at a constant rate in order to obtain the desired pigment properties. The speed of the centrifuge is controlled to return to the reactor the extremely fine colloidal particles of zinc chromate to act as seeds for the precipitation. This has special advantages in controlling the quality of the product. In this instance the cation reactant stream has a concentration of zinc sulfate of approximately 180 grams per liter. The potassium chromate reactant solution can be of any suitable concentration, preferably concentrated. Most preferably the concentration is in the range of 450 to 550 grams per liter. The mother liquor is preferably comprised of zinc sulfate having a concentration in the range of 60 to 70 grams per liter, and potassium sulfate having a concentration in the range of 125 to 175 grams per liter.

A basic carbonate white lead pigment can be produced with the new continuous precipitation method of my invention in accordance with the reaction:

(7)  $3Pb(OAc)_2 + 2Na_2CO_3 + NaOH$
$= 2PbCO_3 \cdot Pb(OA)_2 + 6Na(OAc)$

The reactant solutions of sodium carbonate and sodium hydroxide are preferably mixed in the stoichiometric proportions and added with lead acetate to the mother liquor. The same apparatus can be used as illustrated in FIG. 1, preferably with the pre-mix tank omitted. Precise control of the amounts and rates of the addition of the reactants is desirably maintained since at boiling temperature pH controllers have been found not to be too dependable. The product from the centrifuge is a mixture of basic carbonate lead and crystals of sodium acetate. The white lead pigments can be separated from the sodium acetate by screening, sedimentation, etc. In this embodiment of my continuous precipitation method the mother liquor will preferably contain a concentration of lead ions in the range of 60 to 70 grams per liter, sodium ions in a concentration of 65 to 75 grams per liter, and an acetate ion concentration of approximately 370 grams per liter or saturation. The cation reactant stream of lead acetate has preferably a lead ion concentration of 100 to 115 grams per liter. The anion reactant stream has a suitable concentration of sodium carbonate, preferably in the range of 90 to 110 grams per liter. The pH is controlled, preferably between 6.5 and 7.5 by the addition of sodium hydroxide is approximately stoichiometric proportion. The sodium hydroxide stream can be of any suitable concentration, preferably 450 to 550 grams per liter.

In all of the preferred specific embodiments of my invention it has been found desirable that the mother liquor be "seeded" by recycling a filtrate containing small particles of the precipitate. Close control over particle size and quality results.

In the following is set forth examples of my invention which are given by way of illustration and not by limitation. The specific concentrations, temperatures, times, compounds, etc. set forth in these examples are not to be construed to unduly limit the scope of the invention.

EXAMPLE I

An aqueous mother liquor was prepared having the following concentrations:

|  | G./l. |
|---|---|
| $ZnSO_4$ | 64 |
| $(NH_4)_2S_2O_3$ | 90 |
| $(NH_4)_2SO_4$ | 150 |

This mother liquor solution was then placed in a reactor consisting of a 3-liter vessel connected in closed circuit with a centrifuge and pump and arranged to maintain circulation therebetween. The vessel was equipped with a heating mantle, an agitator, a thermometer, and a zinc-antimony electrode attached to an indicating millivolt meter. A solution of pure zinc sulfate was prepared having a concentration of 180 grams per liter of zinc ion, and heated to between 90 to 98 degrees C. and maintained at that temperature during use. A solution of ammonium thiosulfate was prepared having a concentration of 790 gram ions of ammonium thiosulfate per liter. To this solution was added enough dark ammonium polysulfide solution to give the thiosulfate a permanent very light yellow color thereby purging it of traces of ammonium sulfite and providing a low concentration of sulfide ion. The sulfide ion initiated the precipitation of zinc sulfide when the two reacting solutions were mixed before being fed into the reactor. The thiosulfate solution was maintained at a temperature between 80 and 90 degrees C. during use. A strong aqua-ammonia is diluted with water to 150 grams per liter placed in a boiling flask equipped with a delivery tube emersed in the mother liquor in the reactor. The mother liquor in the reactor was brought to boil. The zinc and thiosulfate liquors previously prepared were fed into a small pre-mix vessel in a continuous stream of approximately 10 ml. per minute for the zinc and 6 ml. per minute for the thiosulfate liquor. The liquors overflowed from the pre-mix vessel into the mother liquor in the reactor. The voltage of the zinc-antimony-electrode in a reactor began to rise and vapors from the ammonia boiling flask were forced into the reactor at a rate to maintain the voltage between 700 and 730 millivolts. The solution in the reactor turned white in a few minutes. Water was evaporated from the reactor at a rate to maintain a constant volume. The centrifuge and circulating pump were started after 30 minutes at which time crystals of ammonium sulfate became visable in the mother liquor solution in the reactor. The centrifuge basket was filled in 30 minutes after which time it was quickly emptied and was put back into operation. Thereafter it was emptied at regular intervals of 30 minutes or less depending on the capacity of the basket and the rate of precipitation. After each basket discharge a 10 ml. sample of the mother liquor was taken, diluted with 20 ml. of hot water, filtered, and the filtrate quickly analyzed for both zinc and thiosulfate. When concentration of either had drifted from the original values, adjustments were made in either or both of the reactant fed liquors to restore the beginning concentrations in the mother liquor in the reactor. Throughout the precipitation the ammonia vapor addition to the reactor was continuous and adjusted to maintain the voltage of the electrode at 700 to 730 millivolts. After five hours it was noted that the electrodes were partially polarized by a coating of zinc sulfide, and were replaced with clean ones. The basket discharge from the centrifuge contained a mixture of zinc sulfide and ammonium sulfate crystals and a small amount of mother liquor. This mixture was agitated in sufficient warm water to dissolve all the ammonium sulfate leaving the zinc sulfide in suspension in the saturated ammonium sulfate solution. The mixture was then dewatered by centrifuging, leaving a cake of zinc sulfide and a clear solution of ammonium sulfate.

The zinc sulfide pigment produced was of excellent quality and was capable of use as a pigment in paint or paper without further treatment. However, a portion of the product was calcined at a low temperature according to conventional methods and the product showed further improvement. The wet cake recovered from the separation of ammonium sulfate crystals was washed free of water soluble salts, dried and calcined in an oven oxygen-free atmosphere for 30 minutes and between 550 and 650 degrees, cooled in an oxygen-free atmosphere and milled in a dry impact mill. This further improved the quality of the zinc sulfide pigment.

EXAMPLE II

Zinc sulfide was prepared according to reaction (5) set forth hereinbefore. Using basically the same apparatus described in Example I a mother liquor was prepared having the following concentrations:

| | G./l. |
|---|---|
| Zinc sulfate | 64 |
| Ammonium sulfate | 220 |

The mother liquor solution was placed in the reactor and a reactant stream of an aqueous solution of zinc sulfate having a concentration of 180 grams per liter of zinc was metered to the mother liquor solution. Simultaneously $H_2S$ gas was bubbled in the mother liquor mixture. The relative rates of the two reactants was adjusted so that a stoichiometric relation was maintained. The pH of the solution was maintained as before by bubbling ammonia into the mother liquor mixture to maintain the pH between 3.0 to 5.0. As before, water was boiled off at a rate equal to the rate it was introduced by the incoming reactant stream. The end product obtained by centrifuging as before was a mixture of a zinc sulfide pigment and ammonium sulfate crystals. These were separated as before. The zinc sulfide pigment was of high quality and was adapted to be used without further treatment.

EXAMPLE III

Zinc sulfide pigment was produced in accordance with the reaction (3) set forth hereinbefore. Basically the same apparatus was used as described in Example I. A mother liquor mixture was prepared which had the following concentrations:

| | G./l. |
|---|---|
| Zinc sulfate | 64 |
| Sodium sulfate | 240 |

Reactant streams of an aqueous soluiton having a concentration of 180 grams per liter of zinc ion, and sodium sulfide having a concentration of 500 grams per liter were added directly to the boiling mother liquor mixture. The pH of the mother liquor solution was maintained in the range of 3.0 to 5.0 by a careful control of the ratio of the two reactants. The reactants were introduced in approximate stoichiometric ratio of 1 mole of zinc sulfate to 1 mole of sodium sulfide. A slight excess of sodium sulfide increased the pH, and a slight excess of zinc sulfate decreased the pH. In this experiment it was noted that a high dilution (less than 25 grams per liter) of the reactants should be maintained in the mother liquor to obtain the desirable particle size. The zinc sulfide pigment so produced displayed outstanding whitening characteristics which indicated that it was a high quality zinc sulfide pigment.

EXAMPLE IV

Zinc sulfide pigment was produced according to reaction (4) hereinbefore. A mother liquor mixture was prepared containing:

| | G./l. |
|---|---|
| Zinc chloride | 54 |
| Barium chloride | 270 |

The reactant streams were aqueous solutions containing 400 grams per liter of zinc chloride and 300 grams per liter of barium sulfide. The pH of the mother liquor was maintained between 3.0 and 5.0 without the addition of neutralizing base by adjusting the relative rates of the reactant streams. The product from the centrifuge was a mixture of zinc sulfide pigment and $BaCl_2 \cdot 2H_2O$ crystals. The pigment and the crystals were separated by screening same in a saturated barium chloride solution. A low concentration of the reactants was maintained in the mother liquor in order to produce zinc sulfide crystals of a desirable size. The zinc sulfide pigment so produced was of excellent quality.

EXAMPLE V

Pigment quality zinc chromate was produced by the continuous precipitation process in accordance with the reaction:

$$ZnSO_4 + K_2CrO_4 = ZnCrO_4 + K_2SO_4$$

Basically the same apparatus was used herein as was described in Example I. The mother liquor consisted of:

| | G./l. |
|---|---|
| Zinc sulfate | 64 |
| Potassium sulfate | 150 |

Aqueous reactant solutions were introduced into the mother liquor in the reactor in stoichiometric proportions. The zinc sulfate reactant solution contained 180 grams per liter of zinc ions, and the potassium chromate reactant solution contained 500 grams per liter of potassium chromate. The product emerging from the centrifuge was a mixture of zinc chromate and potassium sulfate crystals (anhydrous). The potassium chromate in the mixture was dissolved in water and the resultant solution centrifuged to recover the insoluble zinc chromate pigment. The zinc chromate pigment proved to be of excellent quality.

EXAMPLE VI

The continuous precipitation method of the invention was used to produce basic carbonate white lead in accordance with the reaction (7) set forth hereinbefore. Using the same apparatus a mother liquor mixture having a lead ion concentration of 64 grams per liter, sodium ion concentration of 72 grams per liter, and an acetate ion concentration of 370 grams per liter, having a pH of from 6.5 to 7.5 was prepared and placed in the reaction vessel. The reactant streams were solutions of lead acetate having a concentration of 200 grams per liter, and a sodium carbonate solution having a concentration of 100 grams per liter. The pH was maintained within the aforementioned range by the addition of sodium hydroxide solution having a concentration of 500 grams per liter. The precipitation product was a $2PbCO_3 \cdot Pb(OH)_2$ and sodium acetate crystals. The pigment was separated from the crystals by screening same in a suspension in a saturated solution of sodium acetate, through a 325 mesh screen. The basic carbonate white lead so produced was of excellent quality.

EXAMPLE VII

A cadmium sulfide pigment is produced with the same apparatus described in Example I in accordance with the reaction:

$$CdSO_4 + (NH_4)_2S_2O_3 + 2NH_4OH = CdS + 2(NH_4)_2SO_4$$

A mother liquor solution having the following concentrations is prepared:

| | G./l. |
|---|---|
| Cadmium sulfate | 88 |
| Ammonium thiosulfate | 90 |
| Ammonium sulfate | 150 |

Reactant aqueous streams saturated with respect cadmium sulfate, and ammonium thiosulfate is added to the mother liquor. Ammonia gas is used to maintain a constant pH less than 5 in the same manner set forth in Example I. The cadmium sulfide and ammonium sulfate crystals precipitate out in the mother liquor, which is then separated in a centrifuge. The filtrate is recycled back to the mother liquor. The precipitate is repulped in a saturated solution of ammonium sulfate, and the ammonium sulfate crystals separated. The cadmium sulfide pigment so produced is of a very high quality.

While I have described and illustrated preferred specific embodiments of my invention, it is understood that the continuous precipitation method disclosed can be practiced in other forms than herein described or suggested without departing from the spirit of my invention.

I claim:

1. A precipitation method for continuously producing zinc sulfide pigment comprising, continuously combining in a pre-mix box of a reactor vessel a stream of an aqueous solution of zinc sulfate having a concentration in the range of 170 to 190 grams of zinc ions per liter at a temperature in the range of 90 degrees C. to 98 degrees C., a stream of an aqueous solution of ammonium thiosulfate having a concentration in the range of 790 to 800 grams per liter at a temperature in the range of 90 degrees C. to 98 degrees C., and an aqueous solution of ammonium polysulfide in an amount sufficient to give the ammonium thiosulfate a very light yellow color, adjusting the introduction rates of the streams to maintain generally stoichiometric proportions of zinc sulfate and ammonium thiosulfate, causing the resultant combined stream to continuously overflow the pre-mix box into a boiling aqueous mother liquor containing zinc sulfate of a concentration in the range of 25 to 30 grams per liter, ammonium thiosulfate of a concentration in the range of 85 to 95 grams per liter, saturated with ammonium sulfate of a concentration in the range of 145 to 155 grams per liter, continuously adding to the mother liquor a gaseous mixture of ammonia and steam to maintain the pH of same in the range of 3.0 to 5.0 and so that the voltage between pure metallic electrodes of zinc and antimony immersed in said boiling mother liquor is maintained between 700 and 730 millivolts, the ratio of said gaseous mixture being one volume of ammonia to two volumes of steam, evaporating water from the reactive aqueous mother liquor mixture in the amount equal to the amount added in the combined stream to thereby maintain a constant liquid level in the reactor vessel, and crystallizing two equivalents of ammonium sulfate for each equivalent of zinc sulfide precipitated, continuously circulating the resulting mother liquor mixture in the reactor through a vertical continuous centrifuge thereby substantially separating the mother liquor and the precipitates, recycling the resultant mother liquor filtrate into the reactor, introducing the precipitate to an aqueous saturated solution of ammonium sulfate in a repulping tank, agitating the resultant mixture, continuously transferring the mixture to a bowl classifier, continuously separating in a bowl classifier the resultant relatively large ammonium sulfate crystals from the mixture by raking same from the bottom while simultaneously removing the lighter zinc sulfide in suspension by causing same to overflow, filtering the overflow stream, recycling the filtrate into the repulping tank, and retaining the zinc sulfide product and the anhydrous ammonium sulfate crystals.

2. A precipitation process for continuously producing pigment grade zinc sulfide, comprising, continuously combining in a pre-mix box of a reactor vessel a stream of aqueous solution of zinc sulfate and a stream of an aqueous solution of ammonium thiosulfate, the rate of the streams being adjusted to introduce generally stoichiometric amounts of zinc sulfate and ammonium thiosulfate, transferring the resultant combined stream to a boiling saturated aqueous solution of ammonium sulfate mixture containing a concentration of 25 to 50 grams of zinc ion per liter, ammonium thiosulfate in a concentration in the range of 50 to 100 grams per liter, evaporating water from the liquor mixture in the reactor vessel at a rate equal to the rate of water added in the combined stream to thereby maintain a constant liquid level in the reactor vessel, maintaining the pH of the mother liquor mixture in the reactor in the range of 3.0 to 5.0 and the voltage between pure metallic electrodes of zinc and antimony immersed in said boiling mother liquid between 700 and 730 millivolts, by introducing ammonia at the rate necessary to accomplish same, causing the zinc sulfate and ammonium thiosulfate to react to form a precipitate of zinc sulfide and ammonium sulfate, continuously circulating the resulting mother liquor mixture in the reactor vessel through a centrifuge thereby substantially separating the mother liquor and precipitate, recycling the resultant mother liquor filtrate containing substantial quantities of zinc sulfate and ammonium thiosulfate back to the reactor vessel, introducing the precipitate to an aqueous saturated solution of ammonium sulfate in a classifier, continuously separating the relatively large ammonium sulfate crystals from the resultant suspension mixture by raking same from the bottom while simultaneously removing the lighter zinc sulfide in suspension in the mixture by filtering same, recycling the filtrate to the saturated solution, and retaining the zinc sulfide product.

3. A method for continuously producing zinc sulfide, comprising, introducing a reactant stream of zinc sulfate and ammonium thiosulfate in stoichiometric proportions into a boiling aqueous saturated solution of ammonium sulfate in a reactor vessel, said mother liquor comprised of zinc ions having a concentration in the range of 25 to 50 grams per liter, and ammonium thiosulfate of a concentration in the range of 50 to 100 grams per liter, evaporating water from the mother liquor in the reactor vessel at the rate approximately equal to the rate at which water is introduced in the incoming stream of zinc sulfate and ammonium thiosulfate, while simultaneously maintaining the pH of the mother liquor in the range of 3.0 to 5.0 by introducing ammonia, causing the resultant mother liquor mixture to react to form a precipitate of zinc sulfide and ammonium sulfate, continuously removing a portion of the resultant mother liquor mixture in the reactor vessel, separating the major portion of the ammonium sulfate crystals and the zinc sulfide from said mixture, recycling the remaining filtrate containing substantial quantities of the reactants to the reaction vessel, and separating the remaining zinc sulfide and ammonium sulfate crystals.

4. A continuous precipitation method for producing pigment zinc sulfide comprising, introducing zinc ions, ammonia, and thiosulfate ions in a stoichiometric ratio of 1 gram ion of zinc to 2 gram ions of ammonia, to 1 gram ion of thiosulfate ions, to an aqueous mother liquor containing zinc ions in a concentration in the range of 25 to 50 grams per liter, saturated with ammonium sulfate in the range of 100 to 175 grams per liter, and thiosulfate ions in the range of 50 to 100 grams per liter, evaporating water therefrom to maintain a relatively constant liquid level in the mother liquor mixture, causing the mother liquor mixture to react to form a precipitate including zinc sulfide and ammonium sulfate crystals, continuously removing a portion of the mother liquor mixture, separating the precipitate therefrom, recycling the resultant filtrate containing appreciable zinc ions, thiosulfate ions, and sulfate ions, to the mother liquor mixture, and separating the zinc sulfide pigment from the crystals of ammonium sulfate.

5. A continuous precipitation process for producing pigment grade cadmium sulfide comprising, continuously combining in a pre-mix box of a reactor vessel a stream of an aqueous solution of cadmium sulfate, and a stream of an aqueous solution of ammonium thiosulfate transferring the resultant combined stream to a boiling aqueous mother liquor mixture containing cadmium ions, saturated with ammonium sulfate, and ammonium thiosulfate evaporating water from the mother liquor mixture in the reactor vessel at a rate equal to the rate water is added in the combined stream to thereby maintain a constant liquid level in the reactor vessel, continuously adding ammonia to the mother liquor in the reactor at the rate necessary to maintain the pH of the mother liquor slightly higher than that at which the thiosulfate utilized in the reaction is decomposed causing the cadmium sulfate and the ammonium thiosulfate to react to form a precipitate of cadmium sulfide and ammonium sulfate, continuously circulating the resulting mother liquor mixture in the reactor vessel to a centrifuge thereby substantially separating the precipitates and mother liquor filtrate, recycling the resultant filtrate containing quantities of cadmium sulfide and ammonium sulfate back to the mother liquor mixture in the reactor vessel, introducing the precipitate to an aqueous saturated solution of ammonium sulfate in a classifier, continuously separating the relatively large ammonium sulfate crystals from the resulting mixture by raking same from the bottom while simultaneously removing the cadmium sulfide suspension in the mixture by filtering same, recycling the saturated solution filtrate to the saturated solution, and retaining the cadmium sulfide product and the ammonium sulfate crystals.

6. A continuous precipitation process for producing pigment cadmium sulfide comprising, continuously introducing in stoichiometric portions aqueous reactant solutions of (1) cadmium sulfate and (2) ammonium thiosulfate, and (3) ammonia into a reaction vessel having therein a mother liquor mixture containing cadmium ions, sulfate ions, and thiosulfate ions, continuously evaporating water from the saturated reactive aqueous mother liquor mixture in the reaction vessel at a rate equal to the rate it is being introduced in the reactant solutions, causing precipitation of cadmium sulfide and ammonium sulfate in the reactive aqueous mother liquor mixture while maintaining a relatively constant chemical concentration, continuously removing a portion of the reactive aqueous mother liquor mixture and separating the precipitated cadmium sulfide and ammonium sulfate therefrom, recycling the resultant filtrate containing appreciable amounts of cadmium ions, thiosulfate ions and sulfate ions back to the mother liquor mixture, and separating the precipiated cadmium sulfide and ammonium sulfate.

7. A precipitation method for continuously producing pigment grade zinc sulfide comprising, introducing a reactant stream of zinc sulfate having a zinc concentration of 180 grams per liter, and a reactant stream of sodium sulfide having a concentration of 300 grams per liter into a boiling aqueous mother liquor in a reaction vessel, maintaining generally a stoichiometric ratio between the introduction rates of the reactant, said mother liquor comprised of an aqueous solution of zinc sulfate having a concentration in the range of 60 to 70 grams of zinc ions per liter and saturated sodium sulfate solution, evaporating water from the resultant mother liquor mixture in the reaction vessel at a rate equal to the rate water is added in the reactant streams to thereby maintain a constant liquid level in the reaction vessel, maintaining the pH of the resultant mother liquor mixture at the optimum by adjusting the relative amounts of zinc sulfate and sodium sulfide being introduced in the reactant streams causing the zinc sulfate and the sodium sulfide to react to form a precipitate comprised of a mixture of zinc sulfide and sodium sulfate salt, continuously removing a portion of the resultant mother liquor mixture in the reaction vessel and passing same through a centrifuge thereby substantially separating the liquor filtrate and precipitates, recycling the resultant filtrate containing substantial amounts of zinc sulfate and sodium sulfate back to the mother liquor mixture in the reaction vessel, repulping the precipitate in an aqueous saturated solution of sodium sulfate in a repulping tank, delivering the resultant mixture to a classifier, continuously separating the resultant relatively heavy sodium sulfate crystals from the mixture in the classifier while simultaneously removing the zinc sulfide in suspension in the mixture by filtering same, recycling the saturated solution filtrate back to the repulping tank, and retaining the zinc sulfide product and the sodium sulfate crystals.

8. A continuous precipitation method for producing zinc sulfide comprising, continuously introducing in generally stoichiometric proportions an aqueous reactant stream of zinc sulfate and an aqueous reactant stream of sodium sulfide into a boiling mother liquor in a reaction vessel, said mother liquor comprised of an aqueous solution of zinc sulfate and saturated with sodium sulfate, continuously evaporating water from the reactive aqueous mother liquor mixture in the reaction vessel to maintain a relatively constant level maintaining the pH of the resultant mother liquor mixture at the optimum causing the formation of a precipitate comprised of a mixture of zinc sulfide and sodium sulfate, continuously removing a portion of the reactive aqueous mother liquor mixture and separating the precipitated zinc sulfide and sodium sulfate therefrom, recycling the resultant filtrate containing appreciable amounts of zinc ions, sodium ions, and sulfate ions back into the reaction vessel, and separating the precipitated zinc sulfide and sodium sulfate.

9. A precipitation method of continuously producing cadmium sulfide comprising, continuously introducing in stoichiometric proportions aqueous reactant solutions of (1) cadmium sulfate and (2) sodium sulfide into a mother liquor containing cadimum ions and saturated with sulfate ions in a reaction vessel, continuously evaporating water from the resultant reactive aqueous mother liquor mixture in the reaction vessel at the rate equal to the rate at which it is being introduced in the reactant solutions, causing continuous precipitation of cadmium sulfide and sodium sulfate in the reactive aqueous mother liquor mixture while maintaining a relatively constant chemical concentration in same, continuously removing a portion of the reactive aqueous mother liquor mixture and separating the precipitated cadmium sulfide and sodium sulfate therefrom, recycling the resultant filtrate containing appreciable amounts of cadmium ions, sodium ions, sulfate ions into the mother liquor mixture in the reaction vessel, and separating the precipitated cadmium sulfide from the sodium sulfate.

10. A continuous precipitation process for producing pigment grade zinc sulfide comprising, introducing in approximate stoichiometric proportions a reactant stream of an aqueous solution of zinc chloride having a concentration in the range of 390 to 410 grams per liter, and a reactant stream of an aqueous solution of barium sulfide having a concentration in the range of 290 to 310 grams per liter into a boiling aqueous mother liquor contained in a reaction vessel, said mother liquor comprised of zinc chloride having a concentration in the range of 50 to 60 grams per liter, and saturated with respect to barium chloride, evaporating water from the mother liquor in the reaction vessel at a rate approximately equal to the rate that water is introduced in the incoming stream of reactant, while simultaneously maintaining the pH of the mother liquor in the range of 3.0 to 5.0 by the manipulation of the relative rates at which the reactant streams are added, causing the mother liquor mixture to continuously react to form a precipitate of zinc sulfide and hydrated crystals of barium chloride, continuously circulating the resultant mother liquor mixture in the reactor through a centrifuge thereby substantially separating the precipitate and mother liquor, recycling the mother liquor containing only small amounts of zinc sulfide and barium chloride crystals back to the mother liquor mixture in the reaction vessel, repulping the precipitate in a saturated solution of barium chloride continuously separating the barium chloride crystals from the mixture while simultaneously removing the zinc sulfide in suspension in the mixture by filtering same, recycling the filtrate back to the saturated solution, and retaining the zinc sulfide product and the hydrated crystals of barium chloride.

11. A continuous precipitation process for producing zinc sulfide comprising, continuously introducing in stoichiometric proportions aqueous reactant solutions of (1) zinc chloride, and (2) barium sulfide to a mother liquor saturated with barium chloride mixture in a reaction vessel, continuously evaporating water from the reactive aqueous mother liquor mixture in the reaction vessel at the rate equal to the rate it is being introduced in the reactant solutions, causing precipitation of zinc sulfide and barium chloride in the reactive aqueous mother liquor mixture while maintaining a relatively constant concentration and pH therein, continuously removing a portion of the reactive aqueous mother liquor mixture and separating the zinc sulfide and barium chloride therefrom, recycling the resultant filtrate containing limited amounts of zinc ions, but appreciable amounts of barium ions, and chloride ions, back to the reaction vessel, and separating the precipitated zinc sulfide from the barium chloride to recover the zinc sulfide and barium chloride crystals.

12. A continuous precipitation process for producing cadmium sulfide comprising, continuously introducing in stoichiometric aqueous reactant solutions of (1) cadmium chloride and (2) barium sulfide into a mother liquor mixture in a reaction vessel, said mother liquor mixture containing a saturated solution of barium chloride, causing continuous precipitation of cadmium sulfide and barium chloride crystals in the reactive aqueous mother liquor mixture, evaporating water from said mother liquor mixture to maintain a constant level and concentration, continuously removing a portion of the aqueous mother liquor mixture and separating the cadmium sulfide and barium chloride crystals therefrom, recycling the resultant filtrate containing cadmium ions, barium ions, and chloride ions, back to the mother liquor mixture in the reaction vessel, and separating the precipitated cadmium sulfide from the barium chloride.

13. A continuous precipitation method for producing zinc chromate comprising, continuously introducing in stoichiometric proportions aqueous reactant solutions of (1) zinc sulfate and (2) potassium chromate into a mother liquor saturated with potassium sulfate in a reaction vessel, said mother liquor containing zinc sulfate dissolved therein, continuously evaporating water from the reactive aqueous mother liquor mixture in the reaction vessel at a rate equal to the rate it is being introduced in reactant solutions, causing continuous precipitation of zinc chromate and potassium sulfate in the reactive aqueous mother liquor mixture, while maintaining a relatively constant chemical concentration in the mother liquor mixture favorable for high quality zinc chromate product precipitation, continuously removing a portion of the reactive aqueous mother liquor mixture and separating the major portion of the zinc chromate and potassium sulfate therefrom, recycling the resultant filtrate containing small amounts of zinc chromate and potassium sulfate back to the reaction vessel, and separating the zinc chromate from the potassium sulfate.

14. A continuous precipitation method for producing zinc chromate comprising, introducing reactant streams of (1) aqueous zinc sulfate, and (2) potassium chromate in stoichiometric proportions into a mother liquor saturated with potassium sulfate and containing zinc ions, and chromate ions, evaporating water from the mother liquor mixture to maintain a relatively constant liquor level in same, causing the mother liquor mixture to react to form a precipitate including zinc chromate and potassium sulfate, continuously removing a portion of the mother liquor mixture, separating the precipitate therefrom, recycling the resultant filtrate containing appreciable amounts of zinc ions, sulfate ions, potassium ions and chromate ions to the mother liquor mixture, and separating the zinc chromate precipitate from the potassium sulfate crystals.

15. A continuous precipitation method for producing pigment grade basic carbonate white lead comprising, continuously introducing in stoichiometric proportions aqueous reactant solutions of (1) lead acetate, (2) sodium carbonate, and (3) sodium hydroxide, into a reaction vessel containing a mother liquor, said mother liquor being a saturated solution of sodium acetate, the stoichiometric proportions of the streams of reactants being three moles of lead acetate to two moles of sodium carbonate to one mole of sodium hydroxide, continuously evaporating water from the reactive aqueous mother liquor mixture in the reaction vessel at a rate equal to the rate it is being introduced in the reactant solutions, causing continuous precipitation of basic carbonate white lead and sodium acetate while maintaining a relatively constant chemical concentration in the mother liquor mixture favorable for a quality basic carbonate white lead product precipitation, continuously removing a portion of the reactive aqueous mother liquor mixture and separating the major portion of basic carbonate white lead and sodium acetate therefrom, recycling the resultant filtrate containing a substantial amount of sodium acetate back to the reaction vessel, and separating the basic carbonate white lead and sodium acetate crystals.

16. A method of continuous precipitation comprising, continuously introducing in stoichiometric proportions aqueous reactant solutions of (1) a water soluble metallic salt wherein the metallic ion thereof is selected of the group consisting of zinc and cadmium, and (2) a water soluble sulfide compound into a reaction vessel having contained therein a saturated mother liquor having metallic ions, and a water soluble salt continuously evaporating water from the reactive mother liquor mixture in the reaction vessel at a rate equal to the rate it is being introduced in the reactant solutions, causing continuous precipitation of a metal sulfide and a water soluble salt in the reactive aqueous mother liquor mixture while maintaining a relatively constant chemical concentration and pH in the mother liquor favorable for a high quantity metal sulfide pigment precipitation, continuously removing a portion of the reactive aqueous mother liquor mixture and separating the metal sulfide and precipitated water soluble salt therefrom, recycling the resultant filtrate containing appreciable amounts of metallic salt and water soluble compound back into the reactive vessel, and separating the metal sulfide pigment from the precipitated water soluble salt.

17. The method of claim 16 wherein an inert extender pigment is introduced into the mother liquor along with the reactant solutions to produce a composite pigment which is recovered with the zinc or cadmium precipitate.

18. A method of continuous precipitation comprising, continuously introducing in stoichiometric proportions aqueous reactant solutions of (1) a water soluble cadmium salt, and (2) a water soluble sulfide compound into a reaction vessel, continuously evaporating water from the reactive aqueous mother liquor mixture saturated with said water soluble salt in the reaction vessel at a rate equal to the rate it is being introduced by the reactant solutions causing continuous precipitation of cadmium sulfide and crystals of said water soluble salt in the reactive aqueous mother liquor mixture while maintaining a relatively constant chemical concentration and pH in the mother liquor favorable for a quality cadmium sulfide pigment precipitation, continuously removing a portion of the reactive aqueous mother liquor mixture and separating the cadmium sulfide and precipitated water soluble salt therefrom, recycling the resultant filtrate containing appreciable amounts of water soluble cadmium salt and water soluble compound back into the reaction vessel, and separating the cadmium sulfide from the precipitated water soluble salt to recover the cadmium sulfide pigment and the water soluble crystals.

19. A method of continuous precipitation comprising, introducing a water soluble metal salt and a water soluble sulfide compound into a reaction vessel containing therein a boiling mother liquor saturated with a soluble metal salt having a cation reactable with the anion of said sulfide, causing precipitation of a metal sulfide and a water soluble salt in the mother liquor in said reaction vessel while maintaining a relatively constant chemical concentration and pH in same, withdrawing a portion of the resultant reactive mother liquor mixture and separating the major portion of the metal sulfide and precipitated crystals of water soluble salt therefrom, and recycling the resultant filtrate containing appreciable amounts of water soluble metal salt, and metal sulfide, back into the reaction vessel, and separating the remaining metal sulfide from the precipitated crystals of water soluble salt.

20. A continuous method for producing pigment grade zinc sulfide directly from zinc sulfide ore comprising, calcining zinc sulfide ore with two chemical equivalents of ammonium sulfate at a temperature between 150 degrees C. and 440 degrees C. in the absence of oxygen, condensing the resulting volatile mixture of ammonium sulfite and sulphur and free ammonia in an environment at a temperature above 100 degrees C. and holding the resultant sublimate at that temperature until substantially all the ammonium sulfite has been converted to ammonium thiosulfate, expelling the free ammonia to the mother liquor, combining the resultant zinc sulfate product stream with water to produce an aqueous stream of zinc sulfate, combining the product ammonium thiosulfate with water, introducing the aqueous zinc sulfate and aqueous ammonium thiosulfate in stoichiometric proportions to a boiling aqueous mother liquor mixture in a reaction vessel, said mother liquor mixture comprised of zinc ions having a concentration in the range of 25 to 50 grams per liter, ammonium thiosulfate having a concentration in the range of 50 to 100 grams per liter, and saturated with ammonium sulfate, evaporating water from the mother liquor in the reaction vessel at a rate approximately equal to the rate at which water is introduced in the incoming stream of the zinc sulfate and ammonium thiosulfate, while simultaneously maintaining the pH of the mother liquor in the range measured from a zinc-antimony electrode in the mother liquor producing 695 to 730 millivolts by introducing thereinto the free ammonia expelled and resulting from the ammonium thiosulfate preparation, causing the resultant mother liquor mixture to react to form a precipitate of zinc sulfide and ammonium sulfate, continuously removing a portion of the resultant mother liquor mixture in the reaction vessel, separating the major portion of the ammonium sulfate crystals and zinc sulfide from the mixture, recycling the remaining filtrate containing substantial quantities of the zinc sulfide and ammonium sulfate to the reaction vessel physically, separating the remaining zinc sulfide and ammonium sulfate crystals in a classifier, recycling the ammonium sulfate crystals back to the calcining phase with the zinc sulfide ore to maintain a continuous process, and retaining the pigment zinc sulfide precipitate.

21. A continuous method for producing pigment zinc sulfide directly from zinc sulfide ore comprising, calcining zinc sulfide ore with ammonium sulfate, condensing the resultant volatile mixture of ammonium sulfite and sulphur in an environment above 100 degrees C., passing the resulting free ammonia into the mother liquor and controlling therewith the pH and holding the resultant sublimate at their temperature until substantially all the ammonium sulfite is converted to ammonium thiosulfate, combining the resultant ammonium thiosulfate in an aqueous stream, combining the resultant zinc sulfate product of the calcining with water to produce an aqueous stream of zinc sulfate, combining the aqueous streams of ammonium thiosulfate and zinc sulfate and introducing same into a boiling aqueous mother liquor mixture saturated with ammonium sulfate containing zinc sulfate, evaporating water from the mother liquor at a rate approximately equal to the rate at which water is introduced in the incoming streams, adding the ammonia derived from the calcining process to the mother liquor mixture to maintain the pH of same in the range of 3.0 to 5.0, causing the resulting mother liquor mixture to react to form a precipitate of zinc sulfide and ammonium sulfate, continuously removing a portion of the resultant mother liquor mixture, and separating a major portion of the ammonium sulfate crystals and zinc sulfide from same, recycling the remaining filtrate containing substantial amounts of zinc sulfide to the mother liquor, separating the remaining zinc sulfide and ammonium sulfate crystals in a classifier, recycling the ammonium sulfate crystals to the calcining of zinc sulfide ore and retaining the zinc sulfide pigment.

22. A method of continuous precipitation comprising, continuously introducing into a reaction vessel operating at a boiling temperature stoichiometric proportions of two reactants capable of forming an insoluble precipitate and a crystallizable water soluble salt wherein the reaction proceeds to form an insoluble precipitate and a salt crystallizable in a mother liquor saturated with said water soluble salt, continuously withdrawing a portion of resultant reaction mixture, separating the crystals and precipitate from the mother liquor and returning the separated mother liquor to the reaction vessel wherein continuous boiling removes water added with the reactants at a rate to maintain a constant volume in the reactor, washing the separated mixture of precipitate and water soluble crystals with water to dissolve the water soluble crystals to separate them from the precipitate.

23. A method of continuous precipitation comprising, combining in a reaction vessel an aqueous solution of a metal salt and a stoichiometric amount of a water soluble salt and reacting and forming therein an insoluble precipitate and a by-product crystallizable soluble salt, said reaction occuring in the saturated by-product salt solution while same is boiling and while passing into said reaction vessel the reactants at a rate and regulating the rate of boiling to maintain a substantially constant volume of said saturated by-product salt solution in said reaction vessel, withdrawing from said reaction vessel a portion of the reaction mixture, passing same through separation means and therein separating therefrom a mixture of insoluble product, precipitate and by-product salt crystals, returning mother liquor and fine insoluble precipitate back to said reaction vessel, adding water to the resulting product precipitate and admixed by-product salt crystals, and dissolving the by-product salt crystals, and separating and recovering from the resulting mixture the insoluble product precipitate.

24. A method of producing a metal sulfide by continuous precipitation comprising, combining in a reaction vessel an aqueous solution of a metal salt and a stoichiometric amount of a water soluble sulfide, reacting same therein and producing an insoluble sulfide precipitate and a by-product crystallizable soluble metal salt, said reacting occurring in the saturated by-product solution while same boils, said reactants passed into said reaction vessel at a substantially uniform rate and controlling said boiling to maintain approximately a constant volume of said reactants and reaction medium in said reaction vessel, withdrawing a portion of the resulting reaction mixture and passing same into separation means and therein separating therefrom the resulting fine precipitate and the mother liquor, and the mixed precipitate, and returning said fine precipitate and the mother liquor to said reaction vessel, and repulping the mixture of precipitate and the by-product crystals by adding water thereto to dissolve the crystals, and recovering the insoluble precipitate.

25. A precipitation method of producing inorganic pigments comprising, continuously introducing into a reaction vessel stoichiometric portions of at least two reactant solutions, reacting the reactants thereof in said reaction vessel and forming as a result of said reaction an insoluble pigment precipitate and at least one water soluble crystallizable salt, said reaction vessel containing during said reaction a substantial excess of a saturated solution of said crystallizable salt as a mother liquor, during said reacting boiling said mother liquor and evaporating water therefrom at a rate approximately equal to the rate of water added to said reaction vessel by said reactant solutions and crystallizing resulting by-product salts, continuously withdrawing a portion of the resulting reaction mixture and passing same through separation means and therein separating therefrom a major portion of the salt crystals and a portion of the product pigment precipitate having grown to desired particle size during said reacting and therewith a relatively small amount of the mother liquor, returning the remainder of the withdrawn portion of the reaction mixture to the reaction vessel, adding water to the mixed salt crystals and product pigment precipitate and dissolving the crystals, and filtering the result to recover the product pigment.

References Cited
UNITED STATES PATENTS

| | | | |
|---|---|---|---|
| 1,945,281 | 1/1934 | Leithauser | 23—273 |
| 2,006,259 | 6/1935 | Calbeck | 23—135 |
| 2,368,481 | 1/1945 | MacColl | 23—56 |
| 2,410,916 | 11/1946 | Wilson et al. | 23—56 |
| 2,980,502 | 4/1961 | Goodenough et al. | 23—56 |
| 3,208,834 | 9/1965 | Schulze | 23—273 |

OSCAR R. VERTIZ, *Primary Examiner.*

G. O. PETERS, *Assistant Examiner.*

U.S. Cl. X.R.

23—71, 134, 135, 273